(12) United States Patent
Yin

(10) Patent No.: US 8,360,146 B2
(45) Date of Patent: Jan. 29, 2013

(54) METHOD FOR RESERVOIR FRACTURE AND CROSS BEDS DETECTION USING TRI-AXIAL/MULTI-COMPONENT RESISTIVITY ANISOTROPY MEASUREMENTS

(75) Inventor: Hezhu Yin, Humble, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 354 days.

(21) Appl. No.: 12/678,045

(22) PCT Filed: Oct. 8, 2008

(86) PCT No.: PCT/US2008/079203
§ 371 (c)(1),
(2), (4) Date: Mar. 12, 2010

(87) PCT Pub. No.: WO2009/070384
PCT Pub. Date: Jun. 4, 2009

(65) Prior Publication Data
US 2010/0230095 A1 Sep. 16, 2010

Related U.S. Application Data

(60) Provisional application No. 61/004,875, filed on Nov. 30, 2007.

(51) Int. Cl.
*E21B 47/00* (2012.01)
*G01V 3/18* (2006.01)
(52) U.S. Cl. .............. 166/254.2; 166/250.01; 324/339
(58) Field of Classification Search ............... 166/254.2, 166/250.01; 324/339
See application file for complete search history.

(56) References Cited

U.S. PATENT DOCUMENTS 3,014,529 A * 12/1961 Graham ........................ 175/50
7,066,282 B2 * 6/2006 Chen et al. .................... 175/50
7,629,791 B2 * 12/2009 Bespalov et al. ............. 324/339
2003/0055565 A1 3/2003 Omeragic
2005/0140373 A1 6/2005 Li et al.
2005/0256645 A1 11/2005 Rabinovich et al.
2007/0244646 A1 10/2007 Zhang et al.

OTHER PUBLICATIONS

Anderson, B., et al. (2001), "The Effect of Crossbedding Anisotropy on Induction Tool Response", Petrophysics, v. 42, No. 2, pp. 137-149.
Barber, T., et al. (2004), "Determining Formation Resistivity Anisotropy in the Presence of Invasion", SPE 90526, SPE Technical Conf. & Exh., Houston, TX, pp. 1-25.
Gianzero, S., et al. (1990), "The Response in an Induction Dipmeter and Standard Induction Tools to Dipping Beds", Geophysics, v. 55, No. 9, pp. 1128-1140.

(Continued)

*Primary Examiner* — Giovanna Wright
(74) *Attorney, Agent, or Firm* — ExxonMobil Upstream Research Company Law Dept.

(57) ABSTRACT

The invention is a method for inverting reservoir bi-axial anisotropy and identifying complicated fracture/cross-bedding system (104) by using tri-axial induction logs and wellbore survey/image log data. An inversion method is disclosed that uses all nine components that can be measured by tri-axial induction tools (101), plus borehole azimuth and deviation data, to solve for the tri-axial induction response in an arbitrary anisotropic formation due to the non-orthogonal bedding plane and fracture plane (or cross bedding plane). A mathematical formula is provided relating the conductivity tensor in the tool's reference frame to the conductivity tensor in a reference plane associated with the fracture/cross bedding planes (102). This equation is inverted (103) to yield the conductivity tensor components in the fracture/cross bedding coordinate system, along with dip and azimuth angles for both the fracture/cross bedding planes and the tool.

18 Claims, 6 Drawing Sheets

OTHER PUBLICATIONS

Kunz, K.S., et al. (1958), "Some Effects of Formation Anisotropy on Resistivity Measurements in Boreholes", Geophysics, v. 23, No. 4, pp. 770-794.

Lu, X., et al. (2001), "Three Dimensional Sensitivity Analysis of Induction Logging in Anisotropic Media", Petrophysics, v. 42, No. 6, pp. 566-579.

Moran, J.H., et al. (1979), "Effects of Formation Anisotropy on Resistivity-Logging Measurements", Geophysics, v. 44, No. 7, pp. 1266-1286.

Rosthal, R., et al. (2003), "Field Test Results of an Experimental Fully-Triaxial Induction Tool", SPWLA 44th Annual Logging Symposium, Jun. 22-25, 2003, Paper QQ, pp. 1-14.

Schoen, J.H., et al. (2000), "Aspects of Multicomponent Resistivity Data and Macroscopic Resitivity Anisotropy", SPE 90526, 2000 SPE Annual Technical Conf. & Exh., Dallas, TX, pp. 1-14.

Wang, H., et al. (2006), "Triaxial Induction Logging: Theory, Modeling, Inversion and Interpretation", SPE 103897, 2006 SPE Int'l. Oil & Gas Conf. & Exh., Beijing, China, pp. 1-19.

Zhdanov, M., et al. (2001), "Foundation of Tensor Induction Well Logging", Petrophysics, v. 42, No. 6, pp. 588-610.

*International Search Report and Written Opinion*, dated Dec. 15, 2008.

\* cited by examiner

METHOD FOR RESERVOIR FRACTURE AND CROSS BEDS DETECTION USING TRI-AXIAL/MULTI-COMPONENT RESISTIVITY ANISOTROPY MEASUREMENTS

CROSS-REFERENCE TO RELATED APPLICATION

This application is the National Stage entry under 35 U.S.C. 371 of PCT/US2008/079203 that published as WO 2009/070384 and was filed on 8 Oct. 2008, which claims the benefit of U.S. Provisional Application No. 61/004,875, filed on 30 Nov. 2007, each of which is incorporated by reference, in its entirety, for all purposes.

FIELD OF THE INVENTION

This invention relates to the field of hydrocarbon exploration and production, and more particularly to resistivity logging. Specifically, the invention is a method for the inversion of multi-components/tri-axial induction measurements in a fractured reservoir and cross-bed sand to yield characterization of anisotropic resistivity with biaxial symmetry. An inversion scheme and method is disclosed that can use all nine tensor components of induction measurements, borehole azimuth, and deviation data.

BACKGROUND OF THE INVENTION

Resistivity is one of the most important parameters measured in wells for hydrocarbon exploration and production. For many years, conventional induction tools have been built with coils that have magnetic moment along the tool axis (co-axial dipole) that is mainly sensitive to the horizontal resistivity when the formation is horizontal and the well is vertical. Different designs of co-axial multi-coils array induction has appeared in the literature for over 30 years. Although theoretical work on resistivity anisotropy measurements started in 1950's (See Kunz and Moran, "Some effects of formation anisotropy on resistivity measurements in boreholes," *Geophysics* 23, 770-794 (1958)), and the detailed theoretical derivation on the magnetic moment perpendicular to the tool axis (co-planer dipole) was also published in 1979 (Moran and Gianzero, "Effects of formation anisotropy on resistivity logging measurements," *Geophysics* 44, 1266-1286 (1979)), the multi-component/tri-axial induction tool was not introduced into commercial service until the first decade of the 21$^{st}$ century. First, Baker Atlas commercialized its multi-component tool-3DEX (Schon et. al., "Aspects of Multicomponent resistivity data and macroscopic resistivity anisotropy," SPE 62909 (2000)), and Schlumberger introduced their version of a tri-axial induction tool-AIT-Z (Rosthal et al., "Field test results of an experimental fully tri-axial induction tool", SPWLA 44$^{th}$ Annual Symposium, Paper QQ (2003)); and Barber et. al., "Determining formation resistivity anisotropy in the presence of invasion", SPE 90526 (2004)). However, these multi-component/tri-axial component tools have been mainly marketed as a thin-bed, low-resistivity-pay tool to invert horizontal and vertical resistivity $R_h$, and $R_v$, to be used with assumptions of vertical transverse isotropy ("VTI") symmetry for (for example) thinly laminated formation, or Horizontal Transverse Isotropy (HTI) symmetry for vertical fractures (Rabinovich et al., "Determination of fracture orientation and length using multi-component and multi-array induction data," U.S. Patent Application No. 2005/0256645 (2005)). Within the framework of a transverse isotropic model, $R_v$ is assumed to be greater than $R_h$. (The tool used is designed mainly as a thin-bed tool for laminated formations. Then, in thinly laminated sand-shale sequences with high-low resistivity, the series combination of resistances (Rv) must be greater than the parallel combination (Rh).) Hence, when the inverted $R_h$ is greater than $R_v$, one solution that has been used to reconcile this conflict is to force the horizontal resistivity to be equal to vertical resistivity, $R_h=R_v$, i.e., isotropy.

FIG. 1 illustrates a case where the inverted $R_h$ is forced to equal $R_v$. Record 11 displays the recorded voltage measurements made with a multi-component/tri-axial induction tool. The dashed line is the $V_{xx}$ data, the dotted line is $V_{yy}$ and the solid line is $V_{zz}$. The different layers are illustrated at 12 as a function of depth. Shale layers are denoted by reference number 13; 14 is a thin-bed zone; and 15 is a layer with crossed beds or fractured beds. In the shale and thin-bed formations, $V_{xx}=V_{yy}$, i.e., these two orthogonal measurements match when rotated to be aligned, and in these formations the consequent inversion for $R_h$ works as can be seen from record 16 where the dotted line represents $R_h$ and the solid line $R_v$. But in the cross-bed or fractured bed formation 15, there are physical reasons why $V_{xx} \ne V_{yy} \ne V_{zz}$ after azimuthal and dip rotations, and it can be seen in record 16 that the inversion method has had to force $R_h$ and $R_v$ to be equal in formation 15. Such problems can arise, for example, in the Piceance Basin where tight gas sandstone often have natural vertical fractures. Such results indicate that the $R_v$ and $R_h$ inversion is problematic when one cannot rotate the measured 9-component data to match the two orthogonal magnetic moments in the bedding plane, e.g., $H_{xx} \ne H_{yy}$ (FIG. 1). Record 17 is a corresponding gamma ray log.

As shown in the schematics of FIGS. 2A and 2B, the nine components ($\sigma_{ij}$) of the conductivity tensor (conductivity and resistivity are mutually reciprocal quantities) measured by three pairs of the orthogonally orientated magnetic dipoles can be rotated through inversion to find $\sigma_h$, $\sigma_v$, within the framework of a VTI or HTI model. All other non-diagonal terms in the conductivity matrix should vanish when borehole, tool eccentricity, and other effects (such as invasion) are corrected, or become small enough to be ignored. In case the formation has VTI or uniaxial anisotropy, the relationship between the tensor conductivity in bedding coordinate and tri-axial induction measurements in borehole coordinates can be expressed by a rotation matrix (R), in the form $\vec{\sigma}'=\vec{R}^T \cdot \vec{\sigma} \cdot \vec{R}$, i.e., $$\vec{\sigma}'_{ij} = \vec{R}^T \cdot \begin{bmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{bmatrix} \cdot \vec{R} \Rightarrow \begin{bmatrix} \sigma_{xx} & 0 & 0 \\ 0 & \sigma_{yy} & 0 \\ 0 & 0 & \sigma_{zz} \end{bmatrix} \quad (1)$$

$$= \begin{bmatrix} \sigma_h & 0 & 0 \\ 0 & \sigma_h & 0 \\ 0 & 0 & \sigma_v \end{bmatrix}$$

where $$\vec{R} = \begin{bmatrix} \cos\alpha\cos\beta & \cos\alpha\sin\beta & -\sin\alpha \\ -\sin\beta & \cos\beta & 0 \\ \sin\alpha\cos\beta & \sin\alpha\sin\beta & \cos\alpha \end{bmatrix}$$

In many cases, the above expression cannot be realized by rotation and inversion because the formation simply has higher anisotropic symmetry than VTI system. FIG. 3A shows an aeolian outcrop section with complicated bedding planes (indicated by solid lines 41), cross-bedding planes (indicated by dotted lines 42), and fault/fracture planes (indicated by broken lines 43). In such a more general anisotropic case, the process expressed in Equation (1) can never be realized by a matrix rotation and inversion process such as is shown in FIG. 1, where the inversion process is limited to an assumption of VTI, or HTI, or in general, uniaxial anisotropic symmetry with arbitrary plane. Note that the thickness of crossbed varies in the range of meters in the large view of FIG. 3A (see the cartoon people in the lower right for scale), but also includes fine layers in the range of mm to cm as shown in the exploded view of FIG. 4B (ball-point pen shown as scale indicator). In such more general anisotropic cases, assumptions of the TI symmetry for tri-axial induction measurements and inversion will break down, and dip, azimuth, and resistivity anisotropy will be different if they are inverted from the data taken from transmitter-receiver pairs with different spacing from multi-spacing tools.

What is needed is an inversion method that can use all nine components that can be measured by tri-axial induction tools, plus borehole azimuth and deviation data, to address these issues and solve for the tri-axial induction response in an arbitrary anisotropic formation due to the non-orthogonal bedding plane and fracture plane (or cross bedding plane). The present invention provides such a method.

SUMMARY OF THE INVENTION

In one embodiment of the present inventive method, referring to the flow chart of FIG. 10, the invention is a method for detecting fault or cross-bedding planes (hereinafter, "fault" planes) in subsurface petroleum reservoir formations with bi-axial anisotropy (one axis perpendicular to the formation's bedding planes, the other perpendicular to the fault planes) from conductivity/resistivity measurements made in a well using a multi-component, tri-axial induction well logging tool, comprising:

(a) expressing a formation conductivity tensor with components as measured by the well logging tool (step 101), wherein each component of said tensor is expressed (step 102) as a combination of the conductivity components:
  (i) conductivity normal to bedding plane $\sigma_{nb}$,
  (ii) conductivity parallel to bedding plane $\sigma_{pb}$,
  (iii) conductivity normal to fault plane $\sigma_{nf}$,
  (iv) conductivity parallel to fault plane $\sigma_{pf}$, (b) inverting the expression for the formation conductivity tensor to obtain $\sigma_{nb}$, $\sigma_{pb}$, $\sigma_{nf}$, and $\sigma_{pf}$ from the measured conductivity data (step 103); and (c) detecting one or more fault planes from indications of anisotropy in the inversion results (step 104).

In some embodiments of the invention, azimuth and dip angles for the fault planes and azimuth and dip angles for the tri-axial induction well logging tool are also obtained from the data inversion.

BRIEF DESCRIPTION OF THE DRAWINGS

The present invention and its advantages will be better understood by referring to the following detailed description and the attached drawings in which:

FIG. 2A shows an example of a formation having vertical transverse isotropy, a thinly laminated formation, while

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF EXAMPLE EMBODIMENTS

The present invention is a method for inverting reservoir bi-axial anisotropy and identifying complicated fracture/cross-bedding system by using tri-axial induction logs and wellbore survey/image log data. Bi-axial anisotropy is a direct indication of fracture/cross-bedding reservoir rock, and has a significant impact on reservoir characterization, e.g. hydrocarbon pore fluid estimation. The present inventive method will yield profiles of $R_{xx}$, $R_{yy}$ and $R_{zz}$, from which it will be possible to ascertain the presence of faults, among other benefits of knowing the resistivity model in its full, anisotropic complexity.

Description of Biaxial Resistivity System

Next, the conductivity equations for the biaxial anisotropic resistivity formation will be developed by considering four, progressively more general, cases.

Uniaxial/VTI Bed and Orthogonal Fault/Fracture System

Figure 1:
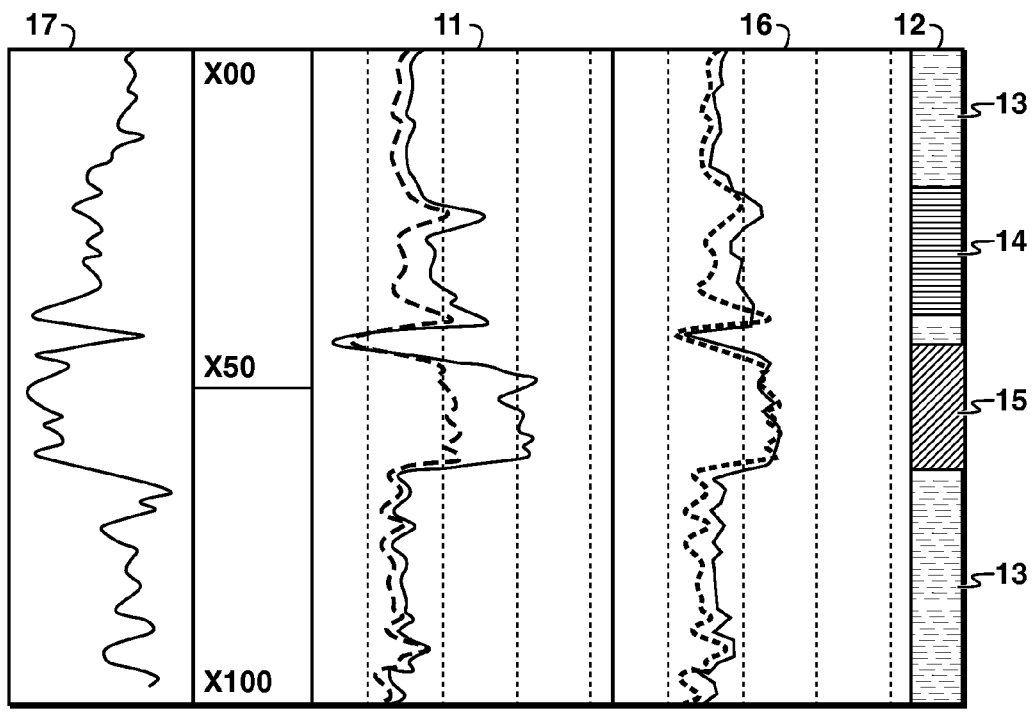
FIG. 1 shows data taken by a tri-axial resistivity logging tool where $V_{xx}$ cannot be rotated to match $V_{yy}$, making inversion of the data to obtain resistivity information problematic.
Figure 2A:
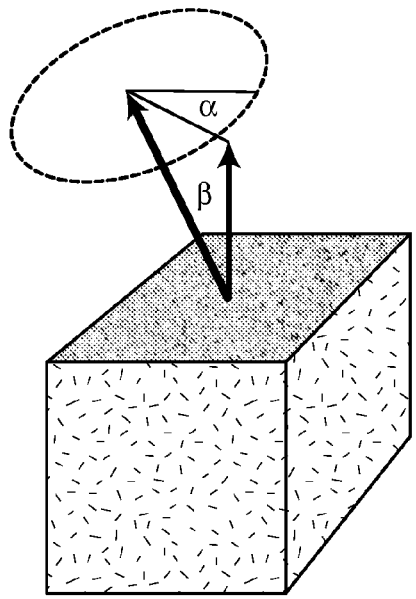
Figure 2B:
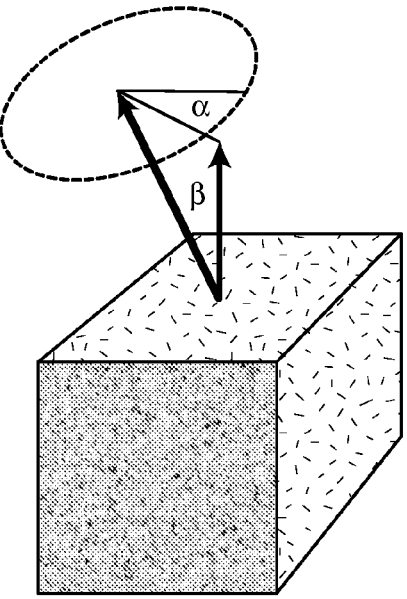
FIG. 2B shows an example of a formation having horizontal transverse isotropy, a vertically fractured formation.
Figure 3A:
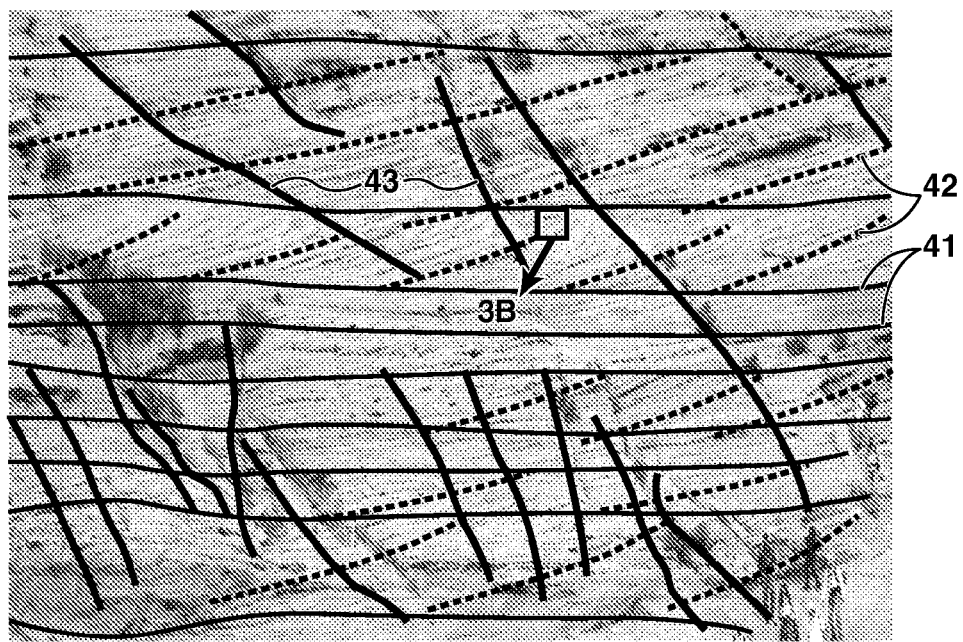
FIG. 3A shows an aeoline outcrop section with complicated bedding planes, cross-bedding planes and fault/fracture planes.
Figure 3B:
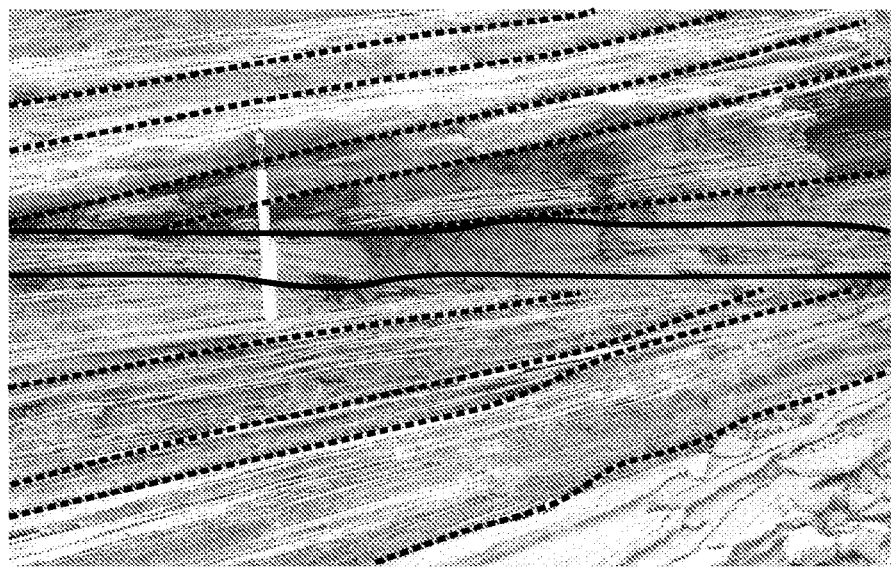
FIG. 3B shows an exploded view of a small portion of FIG. 4A.
Figure 4:
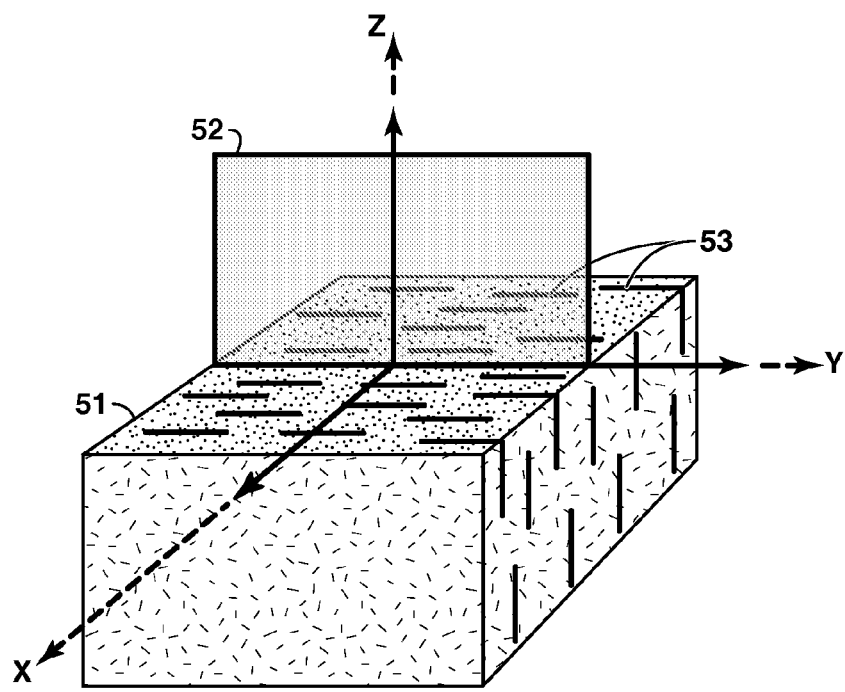
FIG. 4 is a schematic diagram of a biaxial anisotropic formation composed of a uniaxial/VTI bed with the bedding plane arbitrarily in the X-Y plane, and a fault/fracture plane in the Z-Y plane, perpendicular to the bedding plane.

One example of a biaxial anisotropic formation may be described as laminated beds intercepted by perpendicular fault/fractures (53 in FIG. 4), i.e., two orthogonal uniaxial systems (VTI+HTI). FIG. 4 is a schematic diagram of a biaxial anisotropic formation composed of a uniaxial/VTI bed with the bedding plane 51 in the X-Y plane, and a fault/fracture plane 52 in the Z-Y plane, perpendicular to the bed ding plane. This special biaxial anisotropic case can be described by four basic tensor conductivities composed of:
(a). Conductivity normal to bedding plane ($\sigma_{nb}$);
(b). Conductivity parallel to bedding plane ($\sigma_{pb}$);
(c). Conductivity normal to fault plane ($\sigma_{nf}$); and
(d). Conductivity parallel to fault plane ($\sigma_{pf}$).
Note that VTI is a function of $\sigma_{nb}$ and $\sigma_{pb}$, and HTI is a function of $\sigma_{nf}$ and $\sigma_{pf}$.

Then, the tensor conductivity $\vec{\sigma}$ in the X, Y, and Z directions, is simply the summation of the conductivity in each direction:

$$\vec{\sigma} = \begin{cases} \sigma_{xx} = \sigma_{nf} + \sigma_{pb} \\ \sigma_{yy} = \sigma_{pb} + \sigma_{pf} \\ \sigma_{zz} = \sigma_{nb} + \sigma_{pf} \end{cases} \quad (2)$$

Uniaxial/VTI Bed Intercepted by Fault/Fracture Plane with $\alpha°$ Dip

Figure 5:
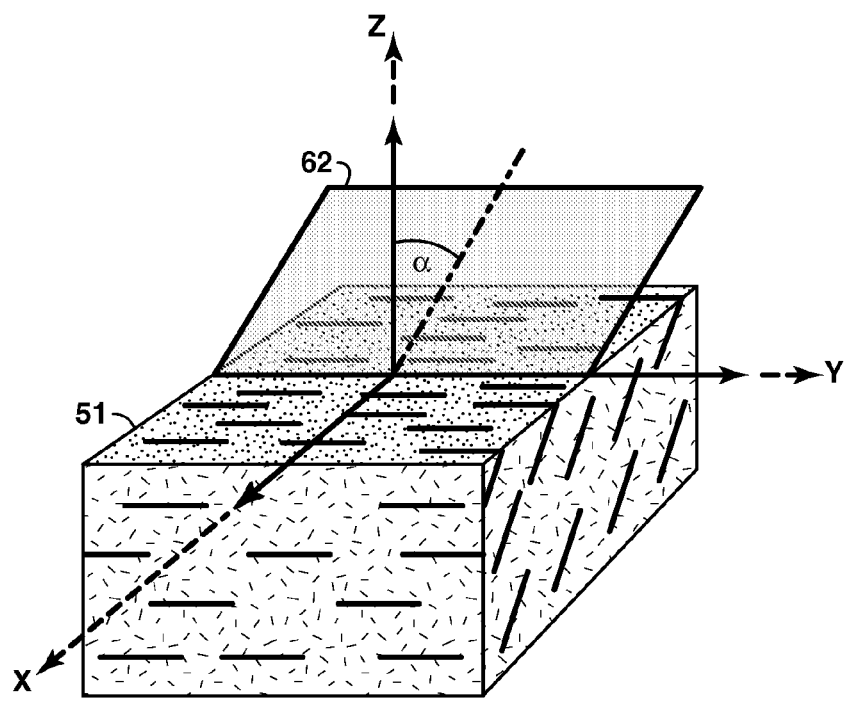
FIG. 5 is a schematic diagram of a formation with an arbitrary bedding plane defined by the X-Y plane, and a fault/fracture plane defined by the Y-Z plane rotated a degrees about the Y-axis from the orthogonal position of FIG. 4.

If the fault/fracture plane 62 is rotated $\alpha°$ about the Y-axis as shown in the schematic diagram of FIG. 5, then such an anisotropic formation with bedding planes 51 aligned with the X-Y plane and fracture plane rotated $\alpha°$ about the Y-axis can still be described by a tensor conductivity $\vec{\sigma}$ that is a function of the four basic conductivities, $\sigma_{nb}$, $\sigma_{pb}$, $\sigma_{nf}$, and $\sigma_{pf}$. In this case, the conductivities in the X, Y, and Z directions, are simply the summation of conductivity in each direction with a fault/fracture dip being a rotation of $\alpha°$ about the Y-axis:

$$\vec{\sigma} = \begin{cases} \sigma_{xx} = \cos\alpha \cdot \sigma_{nf} + \sigma_{pb} \\ \sigma_{yy} = \sigma_{pb} + \sigma_{pf} \\ \sigma_{zz} = \sigma_{nb} + \cos\alpha \cdot \sigma_{pf} \end{cases} \quad (3)$$

Figure 6:
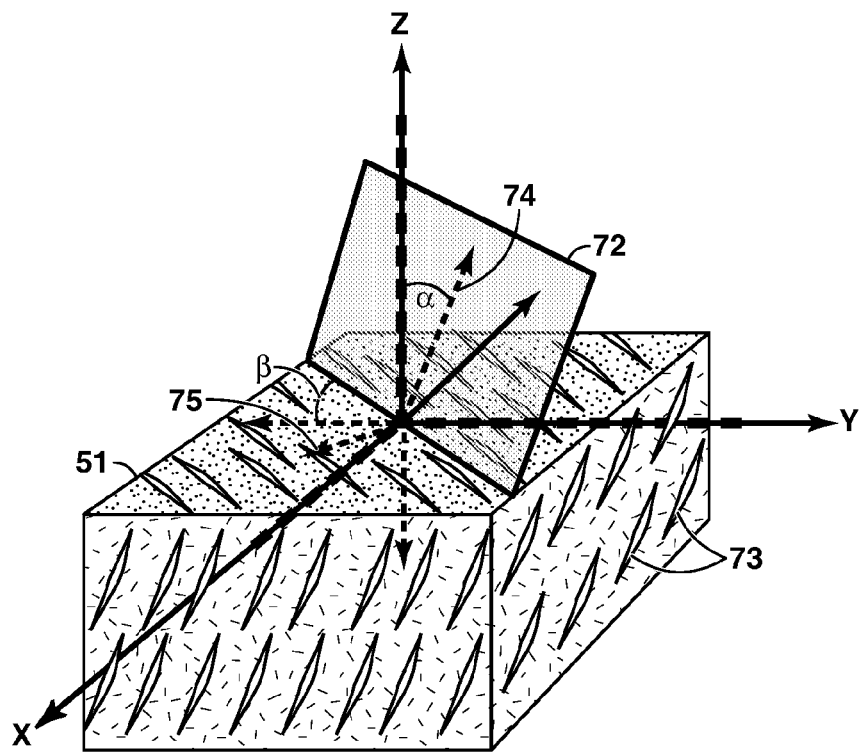
FIG. 6 is a schematic diagram of a formation with an arbitrary bedding plane defined by the X-Y plane, and a fault/fracture plane defined by the Y-Z plane rotated a degrees about the Y-axis (dip) as in FIG. 6, and β degrees about the Z-axis (azimuth)

Uniaxial/VTI Bed Intercepted by Fault/Fracture with $\alpha°$ Dip and $\beta°$ Azimuth/Strike—a General Biaxial Anisotropic Case If in addition to the rotation shown in FIG. 5, the fault/fracture plane is then rotated $\beta°$ about the Z-axis to a position 72 as shown in FIG. 6, then such an anisotropic formation can still be described by a tensor conductivity $\vec{\sigma}$ as a function of the four basic conductivities, $\sigma_{nb}$, $\sigma_{pb}$, $\sigma_{nf}$, and $\sigma_{pf}$. The parallel-to-fault direction is indicated in FIG. 6 by 74, and the normal-to-fault direction by 75. Individual faults are indicated by reference number 73.

The conductivity $\vec{\sigma}$ in the X, Y and Z directions for such a general biaxial anisotropic case is given by the summation of conductivity in each direction with a fault/fracture dip equal to a rotation of $\alpha°$ and an azimuth/strike of the fault/fracture plane equal to a rotation of $\beta°$:

$$\vec{\sigma} = \begin{cases} \sigma_{xx} = \cos\alpha \cdot \cos\beta \cdot \sigma_{nf} + \sigma_{pb} \\ \sigma_{yy} = \cos\beta \cdot \sigma_{pf} + \sigma_{pb} \\ \sigma_{zz} = \sigma_{nb} + \cos\alpha \cdot \sigma_{pf} \end{cases} \quad (4)$$

General Biaxial Anisotropic System with Arbitrary Orientation

FIG. 6 and equation (4) represent a general biaxial system, which however may not be aligned with the tri-axial induction tool measurement system. It will typically not be possible to position the source and receiver(s) in a well (borehole) so that their x-y plane is parallel to the formation bedding planes. The orientation of the bedding planes may not be known, and even if known, the well is not always drilled perpendicular to that plane (e.g., high angle and horizontal wells), and furthermore the tool will rotate in the borehole during the logging. The following expansion of the present inventive method solves these problems.

Figure 7:
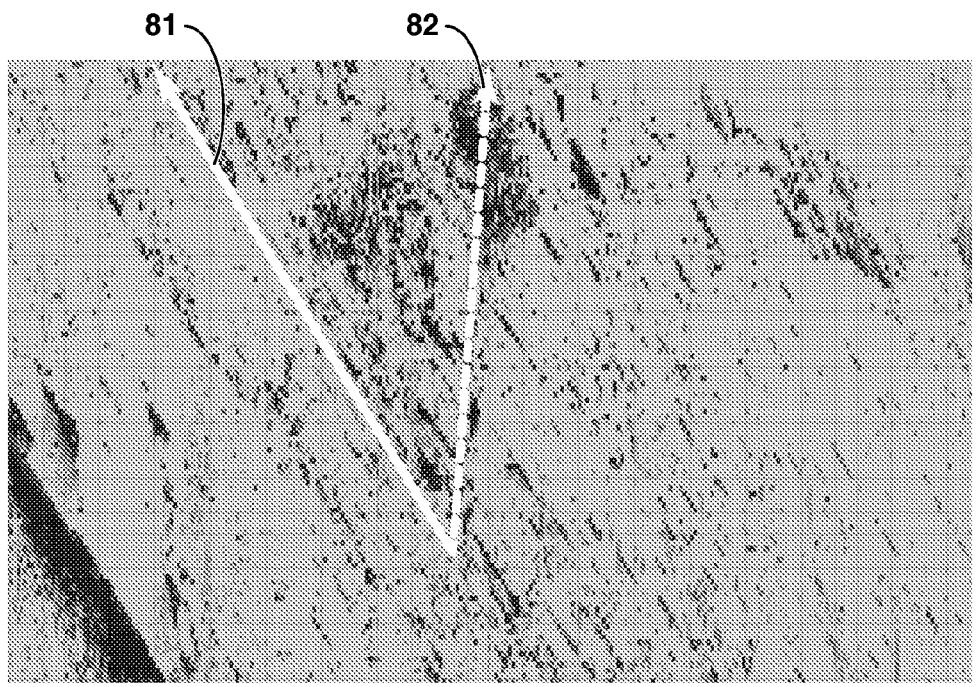
FIG. 7 illustrates an outcrop section showing an example of the general biaxial anisotropic case in which there is no TI symmetry.

A general 3-D biaxial anisotropic resistivity model includes tool axis or borehole with arbitrary deviation angle and strike angle penetrating a series of anisotropic or isotropic beds (with arbitrary dip and strike angles). FIG. 7 shows some dipping beds cut by faults with arbitrary dips and azimuth. 81 shows bedding plane orientation, and 82 indicates the fracture plane. In such a more general anisotropic case, assumptions of the TI symmetry for tri-axial induction measurements and inversion will break down.

Figure 8:
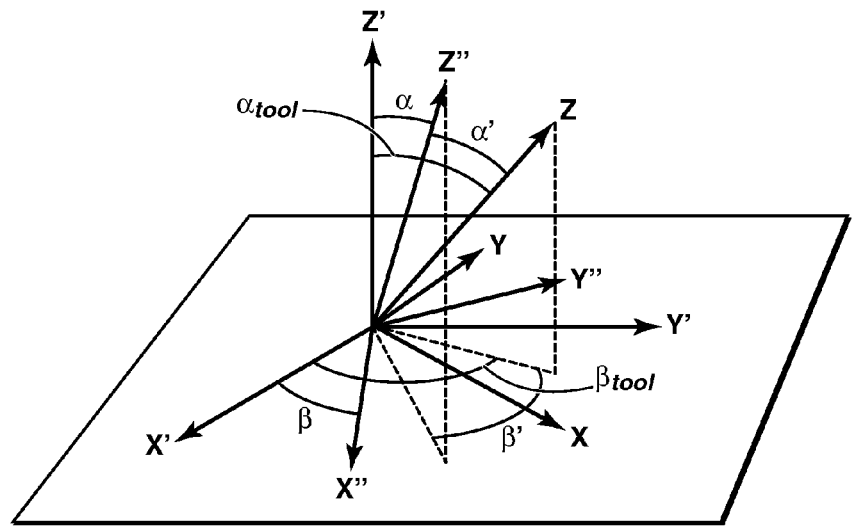
FIG. 8 shows the relation between three coordinate systems useful for inverting measurements by multi-component/tri-axial tools to obtain 3D resistivity results.

Such a generic anisotropic case can be set up using the coordinate system for 3-D resistivity measurement by multi-component/tri-axial tools as shown in FIG. 8. The X-Y-Z axes are oriented such that the Z-axis coincides with the borehole axis. The X'-Y'-Z' coordinate axes are oriented such that the Z'-axis is normal to the formation plane (e.g., the formation layers' boundary plane). The X"-Y"-Z" coordinate axes are oriented such that the Z"-axis is normal to the cross-bedding plane or fracture plane. The borehole (Z-axis) deviation (dip) and strike angles are indicated on FIG. 9 as ($\alpha_{tool}$, $\beta_{tool}$), respectively, and the cross-bedding or fracture plane (Z"-axis) dip and strike angles are shown on FIG. 9 as ($\alpha$, $\beta$), respectively, both being with respect to the formation boundary coordinate axes X'-Y'-Z'. In the X"-Y"-Z" coordinate system, the biaxial conductivity tensors can be expressed as:

$$\vec{\sigma} = \sigma''_{ij} = \begin{bmatrix} \sigma_{xx} & 0 & 0 \\ 0 & \sigma_{yy} & 0 \\ 0 & 0 & \sigma_{zz} \end{bmatrix}. \quad (5)$$

For convenience, the double-prime superscript is dispensed with in writing the individual tensor components. Equation (5) can be expressed in terms of $\sigma_{nb}$, $\sigma_{pb}$, $\sigma_{nf}$ and $\sigma_{pf}$ by substituting the relationships (4).

The conductivity tensors in either the cross bedding plane or faults/fracture plane (or planes if there are multiple fractures) in the X"-Y"-Z" coordinates can be coupled to the borehole axis coordinates X-Y-Z by the following transformation:

$$\sigma = R_2 R_1^{-1} \sigma'' R_1 R_2^{-1} \quad (6)$$

where $$R_1 = \begin{bmatrix} \cos\alpha\cos\beta & \cos\alpha\sin\beta & -\sin\alpha \\ -\sin\beta & \cos\beta & 0 \\ \sin\alpha\cos\beta & \sin\alpha\sin\beta & \cos\alpha \end{bmatrix},$$

and $$R_2 = \begin{bmatrix} \cos\alpha_{tool}\cos\beta_{tool} & \cos\alpha_{tool}\sin\beta_{tool} & -\sin\alpha_{tool} \\ -\sin\beta_{tool} & \cos\beta_{tool} & 0 \\ \sin\alpha_{tool}\cos\beta_{tool} & \sin\alpha_{tool}\sin\beta_{tool} & \cos\alpha_{tool} \end{bmatrix}.$$

The strike angle of the fracture/cross-bedding plane $\beta$ with respect to the formation boundary plane can be arbitrary when the fracture/cross-bedding dip angle $\alpha$ is zero. Similarly, the strike of the tool $\beta_{tool}$ (or borehole) with respect to the formation boundary plane can be arbitrary when tool deviation (e.g., borehole deviation) $\alpha_{tool}$ is zero, i.e., the borehole is vertical.

Theory and Method of Inversion

3D Modeling in Biaxial Anisotropic System

Figure 9:
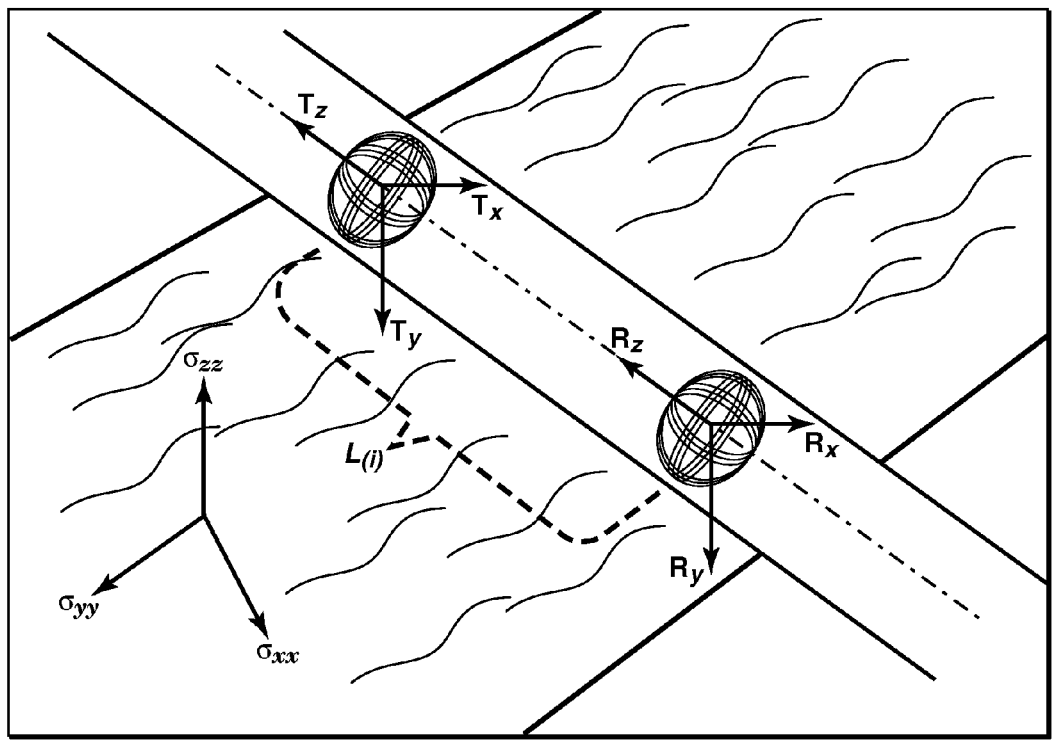
FIG. 9 is a schematic diagram showing tri-axial induction co-located transmitters and receivers in an arbitrarily oriented borehole through a formation with arbitrary anisotropic symmetry.
Figure 10:
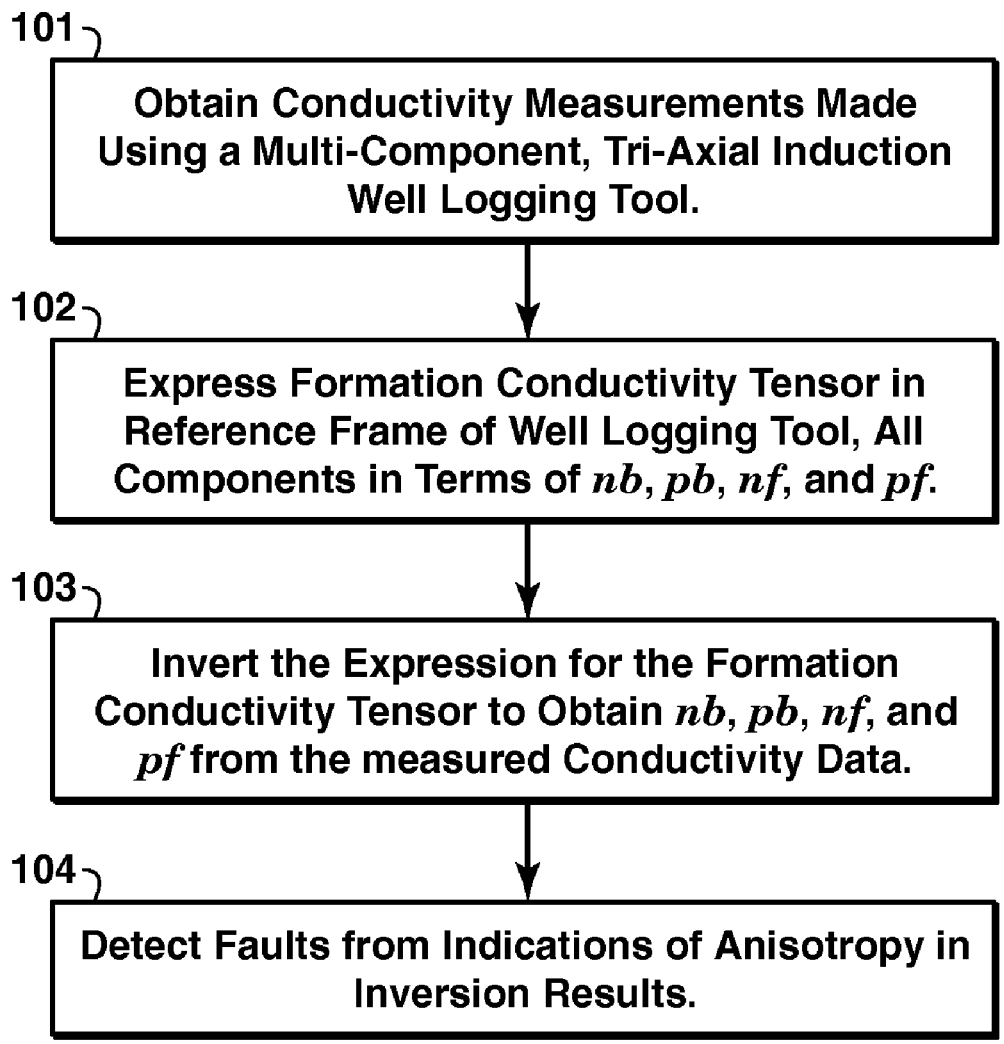
FIG. 10 is a flow chart showing basic steps in one embodiment of the present inventive method.

In the above treatment, a general biaxial anisotropy system was formed by two simple uniaxial anisotropic systems with rotations of arbitrary dip and azimuth angle in a forward modeling scheme for computer simulation of synthetic magnetic moment or voltage data (from which conductivity can be calculated). For such a general biaxial anisotropic system with arbitrary borehole orientation as shown in FIG. 9 and defined by Equation (6), there are seven unknowns: $\alpha_{tool}$, $\beta_{tool}$, $\alpha$, $\beta$, $\sigma_{xx}$, $\sigma_{yy}$, $\sigma_{zz}$. (The nine components of $\sigma$ are measured by the nine components of the multi-component tool oriented with arbitrary dip and azimuth, and the three non-zero components of $\sigma''$, i.e. $\sigma_{xx}$, $\sigma_{yy}$ and $\sigma_{zz}$, are the formation biaxial anisotropic resistivities to be inverted; i.e. to be inferred by an inversion process.)

The inversion process can be designed to match and/or minimize the differences between the computer generated synthetic data in the coordinates of the bi-axial anisotropic system and the field data measured by multi-component/tri-axial tools in the form of magnetic moments $H_{ij}$ (see the previously cited paper by Schon, et. al.), or voltage $V_{ij}$ (previously cited papers by Rosthal et al. and Barber et al.) by iteratively updating the borehole and formation parameters. A tri-axial/multi-component resistivity tool may be constructed with paired transmitters and receivers with multi-frequency measurement channels, or multi-spacings of the transmitter and receiver pairs and each pair can also contain three orthogonally oriented transmitters ($T_X$, $T_Y$ and $T_Z$) and receivers ($R_X$, $R_Y$ and $R_Z$) with the same spacing L(i). This arrangement is illustrated in FIG. 9 and shows how the problem of simulating synthetic H or V data may be set up. The magnetic moments of in-lined and cross-lined coupling between transmitter and receiver pairs can be expressed as $$H_{ij} = \begin{bmatrix} Hxx & Hxy & Hxz \\ Hyx & Hyy & Hyz \\ Hzx & Hzy & Hzz \end{bmatrix} \quad (7)$$

or $$V_{ij} = \begin{bmatrix} Vxx & Vxy & Vxz \\ Vyx & Vyy & Vyz \\ Vzx & Vzy & Vzz \end{bmatrix}$$

where what the tri-axial/multi-component resistivity tool measures is either magnetic field/moment H or the voltage V it induces in the receiver's coil. In an appropriately chosen system of units, H over V is a scalar.

Resistivity logging is based on exciting a source coil with an AC voltage, resulting in a magnetic field generated by the source coil. This magnetic field induces eddy currents in the formation that further induce an AC voltage in a receiver coil, which is measured and recorded. The formation conductivity can be calculated from the known transmitter and receiver parameters and geometry, resulting in a relationship between measured V or H and formation conductivity. This is a tensor relationship in an anisotropic medium. This relationship between the tensor conductivity $\sigma_{ij}$ and the tri-axial dipole magnetic moments $H_{ij}$ can be expressed as:

$$\vec{\sigma}_{ij} = C_{ij} * \vec{H}_{ij} \quad (8)$$

where $C_{ij}$ is a coupling matrix, determined by the well logging tool's design. Each geophysical service company will be able to provide these parameters for its tool.

Therefore, equation (8) is substituted into equation (6) for $\sigma$, and equation (6) is then inverted to yield $\sigma''$. Mathematically, a process for the inversion of Equation (6) can be realized by least-square optimization (see, for example, Zhdanov et al., "Foundation of tensor induction well logging," Petrophysics 42 (2001)), but the invention is not limited to this or any other particular optimization or updating scheme, and a misfit measure, or objective function, can be defined as:

$$\phi(m_p) = \|H_{ij}(d) - H_{ij}(c)\| \quad (9)$$

where $H_{ij}(d)$ and $H_{ij}(c)$ are, respectively, the measured data from the tool and the predicted data from 3D computer simulation using equation (6) based on the values for the seven unknowns assumed for the present iteration cycle.

1D Modeling in Biaxial Anisotropic System Composed of Two TI Systems

The conductivity tensors in either the cross-bedding plane or fracture plane (or planes if a system of multiple fracture sets) expressed in the X"-Y"-Z" coordinate system can also be iteratively solved for through Equation (4) defined by the two orthogonal TI system, i.e., using the tensor conductivity $\vec{\sigma}$ in Equation (4) composed of the four basic conductivities, $\sigma_{nb}$, $\sigma_{pb}$, $\sigma_{nf}$, and $\sigma_{pf}$, and the relative dip $\alpha$ and azimuth $\beta$ between the VTI bedding system and HTI faults/fracture/cross-bedding system. In such a case, the 1D solution described in the Appendix in Anderson et al., "The effect of crossbedding anisotropy on induction tool response", Petrophysics 42, 137-149 (2001), which is incorporated herein by reference, can be reformulated and applied twice orthogonally, and the conductivity tensors $\vec{\sigma}$ can be summed as defined by Equation (4). This 1D+1D approach is a less rigorous way of inverting Equation (6) than an approach such as iterative updating using an objective function as outlined above, but it will significantly reduce the forward computation time, and may be the preferred embodiment of the invention from a practical standpoint. However, these two inversion techniques are examples only, and the present inventive method includes any method of inverting Equation (6) or any equivalent relationship.

Constraints from Related Measurements and Rock Physics

The following features can be advantageously incorporated in the invention, depending upon the circumstances, although they are not essential to the invention.

In the step of the initial iteration, the measured borehole deviation survey data can be used to restrain the initial values of the variables $\alpha_{tool}$, $\beta_{tool}$.

Define VTI anisotropic ratio $\lambda = \sigma_{pb}/\sigma_{nb}$, and HTI anisotropic ratio $\mu = \sigma_{pf}/\sigma_{nf}$.

In hydrocarbon saturated anisotropic systems, it may be assumed that $\sigma_{pb} \gg \sigma_{nb}$, e.g., $\lambda = \sigma_{pb}/\sigma_{nb} \gg 1$, and, $\sigma_{pf} \gg \sigma_{nf}$, e.g., $\mu = \sigma_{pf}/\sigma_{nf} \gg 1$. It may be possible to determine these anisotropic ratios from core plug measurements.

In water saturated anisotropic systems, it may be assumed that $\sigma_{pb} > \sigma_{nb}$, e.g., $\lambda = \sigma_{pb}/\sigma_{nb} \approx 1$-3, and, $\sigma_{pf} > \sigma_{nf}$ e.g., $\mu = \sigma_{pf}/\sigma_{nf} \gg 1$-5. It may be possible to determine these anisotropic ratios from core plug measurements.

With these physical and geological/geographical data constraints, the seven unknown parameters $\alpha_{tool}$, $\beta_{tool}$, $\alpha$, $\beta$, $\sigma_{xx}$, $\sigma_{yy}$, $\sigma_{zz}$ in Equation (6) can be reduced down to five ($\alpha$, $\beta$, $\sigma_{xx}$, $\sigma_{yy}$, $\sigma_{zz}$), or even fewer, for a more manageable inversion process and more robust results.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for detecting fault or cross-bedding planes, hereinafter, called fault planes, in subsurface petroleum reservoir formations with bi-axial anisotropy, meaning one axis perpendicular to the formation's bedding planes, the other perpendicular to the fault planes, from conductivity/resistivity measurements made in a well using a multi-component, tri-axial induction well logging tool, comprising:
   (a) expressing a formation conductivity tensor with components as measured by the well logging tool, wherein each component of said tensor is expressed as a combination of the conductivity components:
      (i) conductivity normal to bedding plane $\sigma_{nb}$,
      (ii) conductivity parallel to bedding plane $\sigma_{pb}$,
      (iii) conductivity normal to fault plane $\sigma_{nf}$,
      (iv) conductivity parallel to fault plane $\sigma_{pf}$;
   (b) inverting the expression for the formation conductivity tensor to obtain $\sigma_{nb}$, $\sigma_{pb}$, $\sigma_{nf}$, and $\sigma_{pf}$ from the measured conductivity data; and
   (c) detecting one or more fault planes from indications of anisotropy in the inversion results.

2. The method of claim 1, further comprising also obtaining azimuth and dip angles for the fault planes from the data inversion.

3. The method of claim 2, further comprising also obtaining azimuth and dip angles for the tri-axial induction well logging tool from the data inversion.

4. The method of claim 3, wherein all dip and azimuth angles are measured relative to a boundary plane of the formation's layers, which is a bedding plane.

5. The method of claim 4, wherein the fault detection is also based on the dip and azimuth angles for the fault planes obtained from the data inversion.

6. The method of claim 3, wherein the quantities determined by the data inversion consist of three diagonal components of the formation's conductivity tensor, a dip angle and an azimuth angle for the fault planes, and a dip angle and an azimuth angle for the tool as situated in the well.

7. The method of claim 1, further comprising inferring presence or absence of hydrocarbons from the inversion results.

8. The method of claim 7, further comprising estimating hydrocarbon pore fluid volume from the inversion results.

9. The method of claim 1, wherein the bedding planes of the biaxial anisotropic subsurface formation are substantially parallel laminated beds of one or more different compositions intercepted by one or more substantially parallel fault planes.

10. The method of claim 9, wherein the step of expressing a formation conductivity tensor comprises:
   (a) defining an orthogonal coordinate system X", Y", Z" where the Z"-axis is perpendicular to the fault planes;
   (b) determining a transformation from the X", Y", Z" coordinate system to an X, Y, Z coordinate system defined by the tri-axial well log tool as deployed in the well, said transformation being a function of orientation angles, dip and azimuth, of each of the two coordinate systems to a third coordinate system defined relative to one or more observable features of the formation;
   (c) relating the measured conductivity data to a 3×3 conductivity or resistivity tensor whose components are in the X, Y, Z coordinate system;
   (d) relating the conductivity tensor $\sigma_{ij}$ in the X, Y, Z coordinate system to its equivalent tensor $\sigma_{ij}"$ in the X", Y", Z" coordinate system using the coordinate system transformation; and
   (e) combining the last two relationships and inverting to determine the components $\sigma_{ij}"$ and the dip and azimuth angles of the X, Y, Z coordinate system and the X", Y", Z" coordinate system.

11. The method of claim 10, wherein the relationship between $\sigma_{ij}$ and $\sigma_{ij}"$ can be expressed as:

$$\sigma = R_2 R_1^{-1} \sigma" R_1 R_2^{-1}$$

where $$R_1 = \begin{bmatrix} \cos\alpha\cos\beta & \cos\alpha\sin\beta & -\sin\alpha \\ -\sin\beta & \cos\beta & 0 \\ \sin\alpha\cos\beta & \sin\alpha\sin\beta & \cos\alpha \end{bmatrix}$$

and $$R_2 = \begin{bmatrix} \cos\alpha_{tool}\cos\beta_{tool} & \cos\alpha_{tool}\sin\beta_{tool} & -\sin\alpha_{tool} \\ -\sin\beta_{tool} & \cos\beta_{tool} & 0 \\ \sin\alpha_{tool}\cos\beta_{tool} & \sin\alpha_{tool}\sin\beta_{tool} & \cos\alpha_{tool} \end{bmatrix},$$

where $\alpha_{tool}$ and $\beta_{tool}$ are respectively the dip and strike angles of the well's axis, where the dip angle is relative to a Z'-axis and the strike angle is rotation about the Z'-axis; $\alpha$ and $\beta$ are the dip and strike angles of the Z'-axis, $\sigma$ and $\sigma"$ are tensor notation for $\sigma_{ij}$ and $\sigma_{ij}"$ respectively, and X', Y', Z' is the third coordinate system defined relative to observable features of the formation.

12. The method of claim 10, wherein relating of the well log measurements $H_{ij}$ to a conductivity tensor is done using a relationship that can be expressed in the form:

$$\vec{\sigma}_{ij} = C_{ij} * \vec{H}_{ij},$$

where $C_{ij}$ is a coupling matrix determined by the well logging tool's design.

13. The method of claim 12, wherein $H_{ij}$ are tri-axial magnetic moments measured by the multi-component, tri-axial well logging tool.

14. The method of claim 12, wherein $H_{ij}$ are voltages measured by the multi-component, tri-axial well logging tool.

15. The method of claim 12, wherein the inversion uses an optimization scheme involving a misfit measure or objective function that can be expressed as:

$$\phi(m_p) = \|H_{ij}(d) - H_{ij}(c)\|,$$

where $H_{ij}(d)$ and $H_{ij}(c)$ are, respectively, the measured data from the multi-component, tri-axial well logging tool and predicted data simulated by forward modeling in the inversion step.

16. The method of claim 1, wherein the inverting step comprises performing two one-dimensional inversions, one to obtain $\sigma_{nb}$ and $\sigma_{pb}$, and the second to obtain $\sigma_{nf}$ and $\sigma_{pf}$, and also obtaining relative dip $\alpha$ and azimuth $\beta$ between a bedding plane coordinate system and a fault plane coordinate system, and then obtaining conductivity tensor $\vec{\sigma}$ components in the fault plane coordinate system from:

$$\vec{\sigma} = \begin{cases} \sigma_{xx} = \cos\alpha \cdot \cos\beta \cdot \sigma_{nf} + \sigma_{pb} \\ \sigma_{yy} = \cos\beta \cdot \sigma_{pf} + \sigma_{pb} \\ \sigma_{zz} = \sigma_{nb} + \cos\alpha \cdot \sigma_{pf} \end{cases}$$

$\sigma_{ij} = 0$ for $i \neq j$.

17. The method of claim 1, further comprising calculating the components of the diagonal conductivity tensor in a coordinate system having a z-axis perpendicular to the fault planes, wherein said components are calculated from $\sigma_{nb}$, $\sigma_{pb}$, $\sigma_{nf}$ and $\sigma_{pf}$.

18. A method for producing hydrocarbons from a subsurface region, comprising:
   (a) making conductivity/resistivity measurements in a well into the subsurface region using a multi-component, tri-axial induction well logging tool;
   (b) obtaining an assessment of anisotropy in the subsurface region due to fracture or cross-bedding planes, said assessment having been made by steps comprising:
      (i) expressing a formation conductivity tensor with components as measured by the well logging tool, wherein each component of said tensor is expressed as a combination of four conductivity components: conductivity normal to bedding plane $\sigma_{nb}$, conductivity parallel to bedding plane $\sigma_{pb}$, conductivity normal to fault plane $\sigma_{nf}$, conductivity parallel to fault plane $\sigma_{pf}$;
      (ii) inverting the expression for the formation conductivity tensor to obtain $\sigma_{nb}$, $\sigma_{pb}$, $\sigma_{nf}$, and $\sigma_{pf}$ from the measured conductivity data;
      (iii) detecting one or more faults from indications of anisotropy in the inversion results; and
   (c) producing hydrocarbons from the subsurface region based on development plans made using the anisotropy assessment.

* * * * *